G. H. WHITELEY, Jr.
MOLD FOR MAKING ARTIFICIAL TEETH.
APPLICATION FILED APR. 1, 1916.
1,191,637.
Patented July 18, 1916.
FIG. 1.
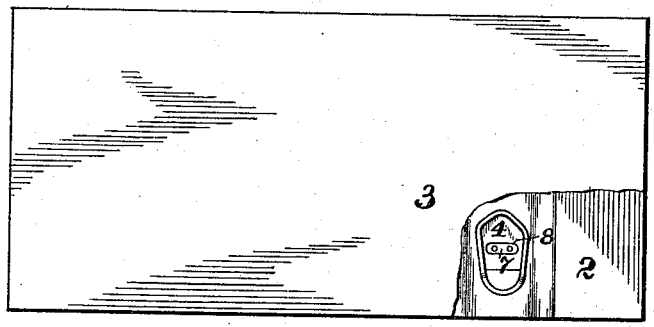
FIG. 2.
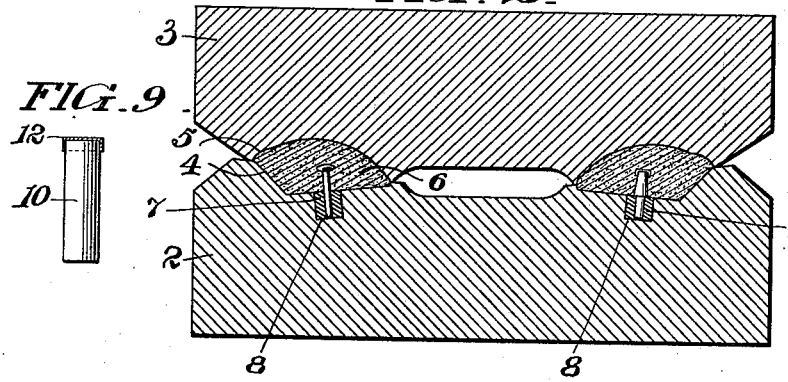
FIG. 9. 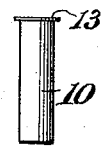 FIG. 10.
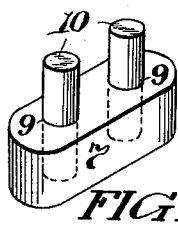 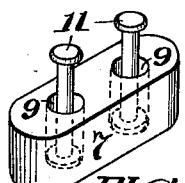 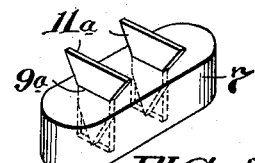
FIG. 3. FIG. 4. FIG. 5.
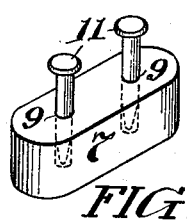 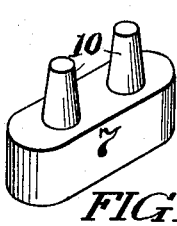 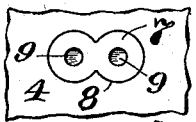
FIG. 6. FIG. 7. FIG. 8.
Witness
Daniel Webster Jr.
E. W. Smith.
Inventor
George H. Whiteley Jr.
By
Attorney

UNITED STATES PATENT OFFICE.

GEORGE H. WHITELEY, JR., OF YORK, PENNSYLVANIA, ASSIGNOR TO THE DENTISTS' SUPPLY COMPANY, A CORPORATION OF NEW YORK.

MOLD FOR MAKING ARTIFICIAL TEETH.

1,191,637.   Specification of Letters Patent.   Patented July 18, 1916.

Application filed April 1, 1916. Serial No. 88,251.

*To all whom it may concern:*

Be it known that I, GEORGE H. WHITELEY, Jr., a citizen of the United States, and resident of York, county of York, and State of Pennsylvania, have invented an Improvement in Molds for Making Artificial Teeth, of which the following is a specification.

The object of my invention is to provide a construction of mold to facilitate the molding of teeth with pins directly molded into the teeth or holes with or without anchors embedded therein for subsequent attachment of the pins.

Heretofore it has been customary to have a mold specially constructed to suit each particular manner of attaching the pins, and as each mold is formed for a full set of upper and lower teeth, it is manifest that the cost of molds is a very large item of expense in the commercial manufacturing of teeth on account of the variation required in the pins and the manner of attaching the same to fill commercial requirements.

The particular object of my invention is to so construct the mold that the same may be provided with detachable parts suitable for supporting posts or pins and be interchangeably employed in the general mold structure, whereby teeth molded in said molds may be provided with pins molded therein, or with holes with or without anchors molded in place at the bottom of the holes, said interchangeable parts suitable for supporting pins of various characters such as pointed pins, double-headed pins, and flat pins, and also suitable for posts which may be adapted merely to the molding of holes with straight or tapered walls and for supporting anchors of various kinds when the same are to be molded in the tooth.

My invention consists in the two main mold parts having recesses which coöperate to form the shape of the tooth to be molded, and that portion of the mold space, corresponding to the back of the tooth, recessed and provided with a detachable block said block having one or more holes adapted for supporting projecting parts which are required to extend into the tooth space and about which the bisque material is to be molded, and in which said projecting parts may be pins or posts according as to whether the tooth is to have pins molded therein or provided with anchors to which pins may be soldered in a subsequent operation.

By use of my invention one complete mold may have a plurality of interchangeable blocks which are interchangeably substituted according to character of the pins to be applied to the tooth; and furthermore, the teeth may be molded in the same general mold so that some of the teeth may have one construction of pins while others may be constructed to be provided with differently constructed pins, according to requirements. In this manner, it is possible to make one mold with the interchangeable blocks, fulfil the requirements of what has heretofore required four or five molds, and the advantage to be gained by the employment of this invention is manifest when it is understood that a very large number of differently shaped molds is necessary to suit the large variety of differently formed teeth.

My invention also comprehends details of construction which, together with the features above specified, are more fully described hereinafter and pointed out in the claims.

Referring to the drawings:—Figure 1 is a plan view of a mold embodying my invention, with a portion broken away to show the mold space; Fig. 2 is a transverse section of the complete mold; Figs. 3, 4, 5, 6 and 7 are perspective views illustrating the removable blocks supporting posts or pins; Fig. 8 is a plan view showing a modified form of the block; and Figs. 9 and 10 illustrate elevations of posts supporting anchors.

2 and 3 are the two parts of the mold, and these are respectively provided with a plurality of recessed portions 4 and 5 which, when brought into opposed relation by the assembling of the two mold parts 2 and 3, provide a tooth space in which the bisque material 6 may be molded to form the tooth. It will only be necessary to describe the construction in respect to one of the tooth spaces, as the same description will apply to all. The back surface of the tooth is molded by the recessed surface 4 in the mold part 2, and this surface is provided with a depression or recess 8 into which loosely fits a removable block 7. These blocks are preferably oblong and formed with two parallel holes or apertures 9, and where the pins are to be flat said apertures may be formed as slots as indicated at 9ª in Fig. 5. If we assume that the block 7 is to support pointed pins, as indicated in the left-hand part of Fig. 2 and in Fig. 6, then the holes 9 have a diameter which substantially corresponds to the shank of the pins 11. The depth of the blocks 7 is preferably equal to the extent to which the pin is required to project from the finished tooth, and it is desirable that these holes shall extend entirely through the block so that they may be easily cleaned and clogging thereby prevented. When the block is in place, as in Fig. 2, the pins 11 are set in the holes, and the points of the pins will rest upon the bottom of the recess 8 and be supported in an upright position by the side walls of the holes 9. In this position, the upper or headed portion will be embedded in the bisque material 6.

After the bisque is molded, it is slightly heated to harden it, then the mold part 3 is removed and the mold part 2 inverted. The molded tooth 6 will drop out of the mold part 2, and this will be assisted by the weight of the block 7 acting upon the bisque. The block 7 is then removed from off the pins 11, and the tooth with the pins embedded therein is then burned or fired to vitrify the bisque material. Ordinarily, there are two pins to each tooth, and for that reason the holes 9 are in duplicate and the blocks 7 are made oblong, but I do not restrict myself to this precise detail as the blocks and apertures will be made to suit the mold and character of the tooth to be molded.

If it were intended that the pins were to be double-headed pins, such as would be employed with a rubber plate instead of a metal backing (as in the case where the pointed pins are employed), then the blocks 7 having the larger holes 9, as shown in Fig. 4, would be placed in the recess 8 and the double-headed pins 11 inserted in said holes and be thus molded in the bisque tooth as before. If instead of the pins being round, flat pins 11$^a$, such as made from a strip of platinum or other suitable metal composition capable of standing high heat, are to be employed, then the block 7 may be provided with slots 9$^a$ instead of round holes, as shown in Fig. 5. When this block is placed in the recess 8 of the mold, it will then be seen that the flat pins will be molded into the bisque tooth. From this description it is manifest that the teeth with various types of pins molded in them may be made in the same mold by merely substituting the interchangeable blocks 7 to suit the particular pins to be supported.

Considering now the use of the mold when anchors are to be employed in the tooth, and to which anchors the tooth pins are to be soldered to form what is known in the trade as "soldered pin teeth:" If the block shown in Fig. 3 and with the cylindrical post 10 is inserted, then it is manifest that the bisque 6 will be molded about the pin or post 10, and that when the tooth is removed from the mold, the block 7, together with the pins or posts, will also be discharged with the tooth. By then picking up the block 7 by use of tweezers, the tooth with the pins or posts may be shaken out. The pins or posts may then be readily withdrawn. In this construction, the tooth would have holes molded therein but no anchors. Anchors may then be inserted and the tooth then fired. When this is done, the anchors will be securely held in the bottom of the holes by the swelling of the walls of the hole over the anchors. The tooth pins may then be secured by being soldered to the anchors in the ordinary way, this being by subsequent operation.

If the anchors are to be molded into the bisque of the tooth, then they are applied to the tops of the posts, as indicated at 12 in Fig. 9 and at 13 in Fig. 10, the former being of a cup-shaped anchor and the latter as a disk. The position of this anchor 13 upon the pin or post may be insured by touching the top of the pin or post with a little vegetable paste to insure the anchor remaining in position during the molding operation, but which will be disengaged from the pin after the molding and drying out and before the firing of the molded tooth. If desired, the pins or posts 10 may have their projecting portions tapered, as indicated in Fig. 7 and as shown at the righthand side in Fig. 2, said taper facilitating the withdrawal of the pins, but in practice this has not been found essential. In the use of such tapering pins, the anchors would be supported upon the tops of the pins. While the bottoms of these pins or posts 10 shown in Fig. 7 may be of the full diameter as indicated in Fig. 3, and in that manner fit the larger holes 9 of the blocks 7, the said pins or posts 10 may be made with smaller shanks where they enter the blocks, as indicated in Fig. 2. When the pins are made with the smaller shanks at the bottom, then they may fit the smaller holes such as indicated in Fig. 6. It is also evident that where holes are to be molded alone or where anchors are to be molded into the bisque and the pins or posts 10 subsequently withdrawn from the model tooth, these pins may fit the holes 9 sufficiently tight to loosen from the molded teeth and drop away therefrom together with the blocks 7 at one operation, and this would especially be feasible where the pins 10 were tapered.

I have shown the blocks 7 as being rounded at each end and with flat opposite sides, this shape being one which may be readily routed out in the mold part 2. In Fig. 8, I have shown the oblong of the aperture 8 to be formed by two intersecting bored holes and the block 7 made to correspond thereto and which, with the holes 8, corresponds to a figure 8, but I do not restrict myself in any manner as to the exact shape of these blocks and apertures. It is also to be understood that while I prefer that the blocks shall only be of a depth which would correspond to the extent of projection of the pin or post from the back of the tooth and so that the hole may extend entirely through the block, I do not restrict myself in this respect as it is manifest that a block of different depth might be employed.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. In a mold for molding teeth, the combination of mold parts having depressed portions which when assembled provide a tooth space, and one of said mold parts having the surface of its depressed portion provided with a recess, and a detachable loosely fitting block fitting the said recess with its upper surface approximately flush with the surface of the depressed portion of the mold part and provided with a hole whose alinement is directed into the tooth space.

2. In a mold for molding teeth, the combination of mold parts having depressed portions which when assembled provide a tooth space, and one of said mold parts having the surface of its depressed portion provided with a recess, and a detachable loosely fitting block fitting the said recess with its upper surface approximately flush with the surface of the depressed portion of the mold part and provided with a hole extending entirely through the block so as to be closed at the bottom by the bottom of the recess and whose alinement is directed into the tooth space.

3. In a mold for molding teeth, the combination of mold parts having depressed portions which when assembled provide a tooth space, and one of said mold parts having the surface of its depressed portion provided with a recess, a detachable loosely fitting block fitting the said recess with its upper surface approximately flush with the surface of the depressed portion of the mold part and provided with a hole whose alinement is directed into the tooth space, and a pin detachably supported in the hole of the removable block and extending up into the tooth space in the mold, whereby said projecting part may be enveloped by the bisque material being molded.

4. In a mold for molding teeth, the combination of mold parts having depressed portions which when assembled provide a tooth space, and one of said mold parts having the surface of its depressed portion provided with a recess, a detachable loosely fitting block fitting the said recess with its upper surface approximately flush with the surface of the depressed portion of the mold part and provided with a hole whose alinement is directed into the tooth space, and a metal post detachably supported in the hole of the block and extending therefrom into the tooth space of the mold and about which the bisque material may be molded.

5. In a mold for molding teeth, the combination of mold parts having depressed portions which when assembled provide a tooth space, and one of said mold parts having the surface of its depressed portion provided with a recess, a detachable loosely fitting block fitting the said recess with its upper surface approximately flush with the surface of the depressed portion of the mold part and provided with a hole whose alinement is directed into the tooth space, a metal post detachably supported in the hole of the block and extending therefrom into the tooth space of the mold, and an anchor supported by the top of the post and about which the bisque material may be molded.

6. In a mold for molding teeth, the combination of mold parts having depressed portions which when assembled provide a tooth space, and one of said mold parts having the surface of its depressed portion provided with a recess, and a detachable loosely fitting block fitting the said recess with its upper surface approximately flush with the surface of the depressed portion of the mold part, said block made oblong and provided with a plurality of apertures opening through the surface and into the tooth space.

7. In a mold for molding teeth, the combination of mold parts having depressed portions which when assembled provide a tooth space, and one of said mold parts having the surface of its depressed portion provided with a recess, a detachable loosely fitting block fitting the said recess with its upper surface approximately flush with the surface of the depressed portion of the mold part, said block made oblong and provided with a plurality of apertures opening through the surface and into the tooth space, said block also having its greatest length transversely to the length of the tooth space, and pins detachably supported in the holes of the block and projecting therefrom into the tooth space whereby said parts are held in substantially parallel alinement and the projecting ends may be surrounded with the material of which the tooth is molded.

8. In a mold for molding teeth, the combination of mold parts having depressed portions which when assembled provide a tooth space, and one of said mold parts having the surface of its depressed portion provided with a recess, a detachable loosely fitting block fitting the said recess with its upper surface approximately flush with the surface of the depressed portion of the mold part, said block made oblong and provided with parallel holes entirely through it, and pins detachably supported within the holes of the block and resting upon the bottom of the recess in the mold part and further having their ends projecting into the tooth space of the mold.

In testimony of which invention I hereunto set my hand.

GEORGE H. WHITELEY, Jr.

Witnesses:
J. O. WHITELEY,
CHARLES L. RODGERS.

Copies of this patent may be obtained for five cents each, by addressing the "Commissioner of Patents, Washington, D. C."